July 19, 1960 P. H. STEINBACH 2,945,918

PUSH BUTTON TELEPHONE DIALING MECHANISM

Filed April 21, 1958

INVENTOR:
Paul H. Steinbach,

BY Bair, Freeman & Molinare
ATTORNEYS.

United States Patent Office 2,945,918

Patented July 19, 1960

2,945,918

PUSH BUTTON TELEPHONE DIALING MECHANISM

Paul H. Steinbach, Skokie, Ill., assignor, by mesne assignments, of one-half to Francis N. Steinbach Filed Apr. 21, 1958, Ser. No. 729,848

10 Claims. (Cl. 179—90)

This invention relates to a push button telephone dialing mechanism and more particularly to a dialing mechanism wherein the dialing is effected through linear movement of push buttons rather than through the rotary movement of a normal dialing mechanism.

The use of a rotary dial mechanism for telephones, while generally satisfactory, does have certain drawbacks. In desk sets where the telephone base is free to move, frequently the torque exerted by the person dialing causes the base to move, with a resultant finger slippage which results in the dialing of a wrong number. Furthermore, the use of linear-type push button mechanisms is so prevalent in offices today, that it is believed that a linear movement push button dialing device would be readily accepted, and would be preferred over the present rotary dial system.

Thus, it is an object of this invention to provide a linear movement, push button type mechanism for use in dialing telephone numbers.

It is believed that the use of a linear movement push button telephone dialing mechanism would greatly increase the number and variety of telephone dialing installations available. Thus, it is contemplated that a push button type telephone dialer could be readily incorporated in ordinary furniture pieces, such as on a wall, or surface of a desk, or in the arm of a chair, or in a drawer of a desk.

Thus, another object of this invention is to provide a linear movement, push button type dialing mechanism which is embodied in a casing that readily lends itself to integral installations in ordinary pieces of furniture.

It will be appreciated that any new telephone dialing mechanism that may be suggested must have the property of being capable of being integrated with the existing telephone dialing system, as the existing system, being a workable one, must necessarily be maintained. All new suggestions must be improvements over the existing system while still incorporating the basic feature of a rotary dialing movement to effect signaling in a central office or through an automatic exchange system. This invention therefore seeks to provide a simple and efficient linear movement, push button dialing mechanism, the operation of which is efficiently translated to a basic rotary dialing movement.

Therefore, a further object of this invention is to provide a simple and efficient linear movement, push button telephone dialing mechanism whose operation may be conveniently and efficiently incorporated into the existing rotary dialing telephone system.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which.

Figures 1, 2, 3, 4, 5:
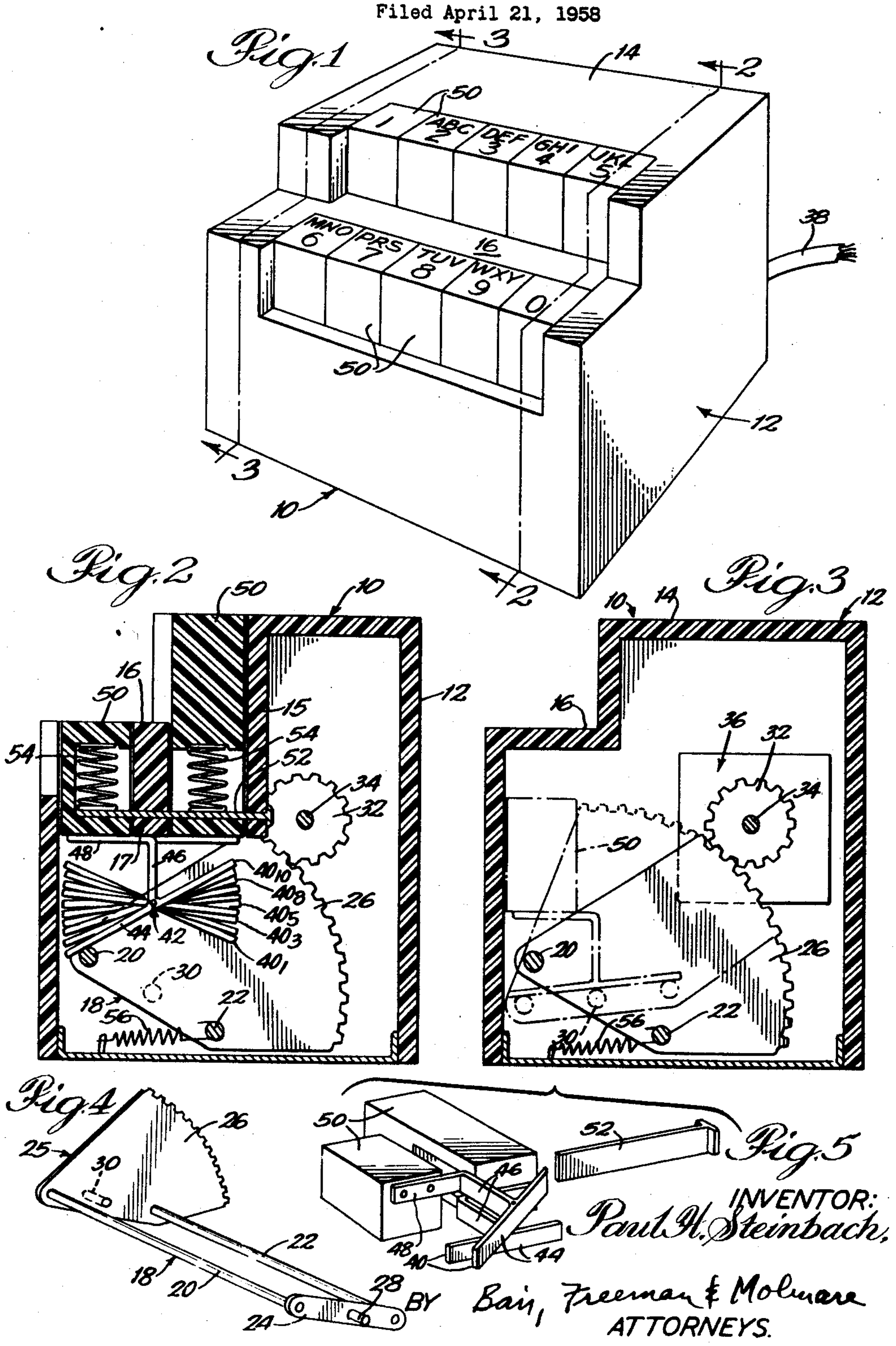
Figure 1 is a perspective view of a telephone dialing device embodying the invention of this application, and which presents linear movement push buttons for effecting the dialing of a telephone number in existing telephone systems.
Figure 2 is a cross-section view taken on line 2—2 of Figure 1 and shows certain details of the linear movement push buttons, and certain details of the means for converting the said linear movement to rotary movement corresponding with present rotary dialing movement.
Figure 3 is a cross-section view taken on line 3—3 of Figure 1.
Figure 4 is a perspective view of the pivotable actuator means shown in Figures 2 and 3.
Figure 5 is a perspective view showing details of the push buttons and of the reciprocable actuators connected thereto.

Referring now to the drawings, there is shown the new telephone dialing device, generally indicated at 10 in Figure 1, and including a casing 12 which encloses the operating mechanism of the dialing device. In a preferred form, the casing 12 has a stepped top wall which defines an uppermost section 14, from whence depends a first interior wall 15, and a lower section 16 from whence depends a second interior wall 17.

Within the casing 12 there is provided a pivotal actuator, generally indicated at 18, which is arranged to have a pre-selected range of pivoting. The pivotable actuator 18 includes a pair of spaced, elongated, parallel bars 20 and 22, which connect at one end to a transverse bar 24 and at their other ends to a second transverse member 25 which is shaped to also define a gear segment 26. A pair of pivot pins 28 and 30 are respectively connected to the transverse bar 24 and to the second transverse member 25, and said pivot pins extend outwardly of the actuator 18 and are arranged to be mounted for pivoting relative to the casing 12. The elongated parallel bars 20 and 22 are disposed diametrically of the pivot axis of the pivotable actuator 18, and are equally spaced on opposite sides thereof.

The gear segment 26 serves as a pivoted-increment determining means, since the amount of pivoting of the pivotable actuator 18 can be correlated with the arcuate movement of the gear segment 26. Furthermore, it is desired that the range of pivoting of the actuator 18 be proportioned to the existing range of pivoting of the dial of a dial telephone, so as to correlate the incremental pivoting of said pivotable actuator 18 with the existing incremental range of pivoting of existing telephone dials.

A preferred form of correlating the range of pivotal movement of the actuator 18 with the pivoting range of the dial of a dial telephone is illustrated in Figures 2 and 3, wherein the teeth of the gear segment 26 are shown meshing with the teeth of a driven gear 32 that is carried by and is rotatable with a pivot shaft 34 that leads to a standard dialing mechanism of a telephone which is contained in the boxlike structure illustrated generally at 36. It is not necessary to illustrate the standard telephone signaling structure 36, as such structure is well known in the art. It is sufficient to note that the gear 32 is designed to have a range of pivoting about the axis of shaft 34 which corresponds identically with the range of rotation of present telephone dialing mechanisms, and the pivotal motion of gear 32 as transmitted by shaft 34 to the standard dialing mechanism provided at 36. The dialing mechanism 36 then connects directly into a telephone system by means of the cord 38, which is seen leading away from the casing 12 in Figure 1.

Now, in order to provide a linear movement push button mechanism which will effect pivotal movement of the pivotable actuator 18, there is provided, within casing 12, ten reciprocable actuators 40, which may be individually identified in serial order by numerals $40_1$ to $40_{10}$, inclusive. These reciprocable actuators 40 are arranged to move linearly in directions transverse to the pivot axis of pivotable actuator 18. The reciprocable actuators 40 are arranged in side-by-side relation, as can best be seen in Figure 2, and, when unactuated, the said actuators 40 are lined up so that when viewed in elevation, as seen in Figure 2, they appear to intersect along an axis, generally indicated at 42, which lies parallel to the pivot axis of the actuator 18 and is located in the vertical plane passing through said pivot axis of actuator 18. Portions of each actuator 40 extend in opposite directions relative to the portion thereof which appears to lie along axis 42.

The reciprocable actuators 40 are each disposed at a different pitch relative to the pivot axis of actuator 18, and the series of ten actuators 40 are uniformly incrementally pitched relative to each other to correspond with each aliquot one-tenth increment of the range of pivoting of said pivotal actuator 18. Thus, when the reciprocable actuator $40_1$ is depressed, it will effect the pivoting of pivotable actuator 18 through precisely one-tenth of its pre-selected range; and when the reciprocable actuator $40_2$ is depressed, it will effect the pivoting of the actuator 18 through two-tenths of its pre-selected range; etc.; up to actuator $40_{10}$, which will effect the pivoting of the pivotable actuator 18 through ten-tenths, or the entire range of the actuator 18.

Each of the actuators 40 consists of a flat bar 44 having a stem portion 46 extending upwardly from the mid-point of bar 44, and then having a laterally extending flange 48, which serves as a key-connecting portion. The adjacent actuators 44 have flanges 48 extending in opposite directions, so that alternate ones of the actuators have their flanges 48 extending in the same direction. The foregoing arrangement of oppositely extending key-connecting flanges 48 permits of the securement of actuator keys 50 to said reciprocable actuators 40 so that the said keys 50 may be arranged in a pair of parallel rows, as can best be seen in Figures 1, 2 and 5. This permits of a more compact arrangement of the actuator keys 50.

It will be seen that the width of each reciprocable actuator 40 is no more than one-half the width of a key 50 to which said actuator is attached. This arrangement provides for a compact arrangement of keys 50 as seen in Figures 1 and 5, as two actuators 40 may be provided within the projected confines of a single key 50, and this permits disposing the keys 50 in a pair of rows, as shown.

In the movement of any of the reciprocable actuators 40, when the key 50 to which the actuator 40 is connected is depressed, the actuator bar 44 will move downwardly, and the portion of bar 44 to the left of axis 42 as seen in Figure 2 will first engage the bar 20 of the pivotable actuator 18, and further downward movement of the key 50 will cause pivoting of the pivotable actuator 18 until the second bar 22 engages the portion of the same bar 44 to the right of axis 42 as seen in Figure 2. At this point further linear movement of the reciprocable actuator 40 is stopped.

With respect to the keys 50, it will be seen that the set of keys which are numbered from 1 to 5 in Figure 1 are disposed in the rear row and are bifurcated, or hollowed out through their entire width, as seen in Figures 2 and 5 for reasons that will become apparent hereinafter. The set of keys which are numbered from 6 to 0 in Figure 1 are disposed in the front row and are hollowed out through their back side, as seen in Figures 2 and 5. The portions of the casing 12, adjacent the front and rear of each key 50, including walls 15 and 17 and the front vertical wall of casing 12, cooperate to restrain movement of said keys 50 along vertical linear paths.

In order to restore the keys 50 and the reciprocable actuators 40 to their original condition, there is provided a spring means for each of the keys. Five elongated, horizontally disposed, headed abutment members 52 are provided which are carried by the upright walls 15 and 17 of casing 12, said members 52 passing through slots in said walls 15 and 17. Each elongated abutment member 52 passes through one bifurcated key of the rear row of keys, which includes keys numbered 1 to 5, and into one hollowed key of the front row, which includes keys numbered 6 through 0. The compression springs 54 are each positioned between the upper portion of a key 50 and said abutment 52, and operate to bias the keys 50 upwardly toward their initial position. It will be seen that each key is individually biased by a spring 54. The pivotable actuator 18, too, may be spring-biased, by means of spring 56 back toward its original position, although the spring return of dialing mechanism 36 could also be relied upon to restore actuator 18 to its original position.

From the foregoing it will be seen that the pivotal actuator 18 extends through the greater portion of the width of the casing 12. However, the casing 12 may be made sufficiently large adjacent the lefthand end, as viewed in Figure 1, so as to accommodate therein the gear segment 26, the gear 32 meshing therewith, and the telephone dialing mechanism 36 which is operated by gear 32. The casing 12 and the keys 50 may be made of metal, plastic, or wood, and the keys 50 may be provided with raised letters and numbers so as to permit of telephone dialing by means of touch.

It will be seen that there has been provided a new dialing mechanism which utilizes linear movement of push buttons to effect the telephone dialing operation, and which provides a mechanism that readily lends itself to integral installations and to incorporation with existing rotary dialing telephone systems.

While there has been shown and described a particular embodiment of this invention, it will be obvious to those skilled in the art that various changes and modifications may be made therein without departing from the invention, and therefore, it is intended in the appended claims to cover all such changes and modifications as fall within the true spirit and scope of the invention.

What I claim as new, and desire to secure by Letters Patent of the United States, is:

1. A telephone dialing device comprising, in combination, a pivotable actuator having a pre-selected range of pivoting, pivoted-increment determining means operatively associated with said pivotable actuator and proportioned to the existing range of pivoting of the dial of a dial telephone, ten reciprocable actuators arranged for reciprocating movement transverse to the pivot axis of the pivotable actuator, a first member carried by said pivotable actuator being spaced from and parallel to the pivot axis of said pivotable actuator and extending transversely of the path of movement of said reciprocable actuators, said first member being positioned to be engaged by a selected reciprocable actuator to effect pivoting of said pivotable actuator through a selected aliquot-tenth part of the range of pivoting of said pivotable actuator, said reciprocable actuators each being incrementally pitched relative to the other reciprocable actuators and to the pivot axis of said pivotable actuator to correspond with the ten signaling positions of a telephone dial, and a second member carried by said pivotable actuator and spaced from and parallel to said first member and extending transversely of the path of movement of said reciprocable actuators and positioned for engagement with each selected reciprocable actuator to stop pivotable movement of said pivotable actuator after a desired pivoting has been effected.

2. A telephone dialing device comprising, in combination, a pivotable actuator having a pre-selected range of pivoting, a gear segment operatively associated with said pivotable actuator and adapted to have its range of pivoting proportioned to the existing range of pivoting of the dial of a dial telephone, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, and an elongated first member carried by said pivotable actuator and being spaced from and parallel to the pivot axis of said pivotable actuator and extending transversely of the path of movement of said reciprocable actuators, said first member being positioned to be directly engaged and moved by a selected reciprocable actuator to directly effect pivoting of said pivotable actuator through a selected aliquot-tenth part of the range of pivoting of said pivotable actuator.

3. A telephone dialing device comprising, in combination, a pivotable actuator having a pre-selected range of pivoting, a gear segment operatively associated with said pivotable actuator and adapted to have its range of pivoting proportioned to the existing range of pivoting of the dial of a dial telephone, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, a first member carried by said pivotable actuator being spaced from and parallel to the pivot axis of said pivotable actuator and extending transversely of the path of movement of said reciprocable actuators, said first member being positioned to be engaged by a selected reciprocable actuator to effect pivoting of said pivotable actuator through a selected aliquot-tenth part of the range of pivoting of said pivotable actuator, and a second member carried by said pivotable actuator and spaced from and parallel to said first member and extending transversely of the path of movement of said reciprocable actuators and positioned for engagement with each selected reciprocable actuator member to stop pivotable movement of said pivotable actuator after a desired pivoting has been effected.

4. A telephone dialing device comprising, in combination, a pivotable actuator having a pre-selected range of pivoting, a gear segment operatively associated with said pivotable actuator and adapted to have its range of pivoting proportioned to the existing range of pivoting of the dial of a dial telephone, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, a first member carried by said pivotable actuator being spaced from and parallel to the pivot axis of said pivotable actuator and extending transversely of the path of movement of said reciprocable actuators, said first member being positioned to be engaged by a selected reciprocable actuator to effect pivoting of said pivotable actuator through a selected aliquot-tenth part of the range of pivoting of said pivotable actuator, a casing means enclosing the pivotable actuator and reciprocable actuators, a key connected to and movable with each reciprocable actuator, and said keys being supported on said casing to afford selective sequential linear movement thereof.

5. A telephone dialing device comprising, in combination, a pivotable actuator having a pre-selected range of pivoting, a gear segment operatively associated with said pivotable actuator and adapted to have its range of pivoting proportioned to the existing range of pivoting of the dial of a dial telephone, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, a first member carried by said pivotable actuator being spaced from and parallel to the pivot axis of said pivotable actuator and extending transversely of the path of movement of said reciprocable actuators, said first member being positioned to be engaged by a selected reciprocable actuator to effect pivoting of said pivotable actuator through a selected aliquot-tenth part of the range of pivoting of said pivotable actuator, a casing means enclosing the pivotable actuator and reciprocable actuators, a key connected to and movable with each reciprocable actuator, and said keys being supported on said casing to afford selective sequential linear movement thereof, and spring means for each key normally biasing each key to its unactuated position.

6. A telephone dialing device comprising, in combination, a pivotable actuator having a pre-selected range of pivoting, a gear segment operatively associated with said pivotable actuator and adapted to have its range of pivoting proportioned to the existing range of pivoting of the dial of a dial telephone, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, a first member carried by said pivotable actuator being spaced from and parallel to the pivot axis of said pivotable actuator and extending transversely of the path of movement of said reciprocable actuators, said first member being positioned to be engaged by a selected reciprocable actuator to effect pivoting of said pivotable actuator through a selected aliquot-tenth part of the range of pivoting of said pivotable actuator, said reciprocable actuators being arranged in side-by-side relation, each actuator having a key-connecting portion extending therefrom, a key connected to and movable with each reciprocable actuator, and alternate actuators having their key-connecting portions disposed in a pair of substantially parallel rows so that the keys connected to said key-connecting portions may be located in a pair of parallel rows.

7. A telephone dialing device comprising, in combination, a pivotable actuator having a pre-selected range of pivoting, a gear segment operatively associated with said pivotable actuator and adapted to have its range of pivoting proportioned to the existing range of pivoting of the dial of a dial telephone, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, a first member carried by said pivotable actuator being spaced from and parallel to the pivot axis of said pivotable actuator and extending transversely of the path of movement of said reciprocable actuators, said first member being positioned to be engaged by a selected reciprocable actuator to effect pivoting of said pivotable actuator through a selected aliquot-tenth part of the range of pivoting of said pivotable actuator, and said reciprocable actuators being arranged in side-by-side relation and disposed, when unactuated, so that a single point of all said actuators are aligned with each other and located in a plane passing through the pivot axis of the pivotable actuator.

8. A telephone dialing device comprising, in combination, a pivotable actuator having a pre-selected range of pivoting, said pivotable actuator including a gear segment pivot means for pivotally mounting said gear segment, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, and a first elongated member connected to said gear segment and to said pivot means and spaced from and parallel to the pivot axis of said pivotable actuator, said first member extending transversely of the path of movement of said reciprocable actuators and being positioned to be engaged by a selected reciprocable actuator member to effect pivoting of said pivotable actuator through a selected aliquot-tenth part of the range of pivoting of said pivotable actuator.

9. A telephone dialing device comprising, in combination, a pivotable actuator having a pre-selected range of pivoting, said pivotable actuator including a gear segment, pivot means for pivotally mounting said gear segment, and a pair of spaced, elongated, parallel bars connected to said gear segment and to said pivot means and disposed diametrically of the pivot axis of said pivot means, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, a first of said pair of parallel bars extending transversely of the path of movement of said reciprocable actuators and being positioned to be engaged by a selected reciprocable actuator member to effect pivoting of said pivotable actuator through a selected aliquot-tenth part of the range of pivoting of said pivotable actuator, and the second of said pair of parallel bars extending transversely of the path of movement of said reciprocable actuators and being positioned for engagement with said selected reciprocable actuator member to stop pivotable movement of said pivotable actuator after a desired pivoting has been effected.

10. A telephone dialing device comprising, in combination, a pivotable actuator having a pre-selected range of pivoting, said pivotable actuator including a gear segment, pivot means for pivotally mounting said gear segment, and a pair of spaced, elongated, parallel bars connected to said gear segment and to said pivot means and disposed diametrically of the pivot axis of said pivot means, ten reciprocable actuators each being disposed at a different pitch relative to the pivot axis of said pivotable actuator and being uniformly incrementally pitched relative to each other to correspond with each aliquot one-tenth increment of the range of pivoting of said pivotable actuator, a first of said pair of parallel bars extending transversely of the path of movement of said reciprocable actuators and being positioned to be engaged by a selected reciprocable actuator member to effect pivoting of said pivotable actuator through a selected aliquot-tenth part of the range of pivoting of said pivotable actuator, the second of said pair of parallel bars extending transversely of the path of movement of said reciprocable actuators and being positioned for engagement with said selected reciprocable actuator member to stop pivotable movement of said pivotable actuator after a desired pivoting has been effected, said reciprocable actuators being arranged in side-by-side relation, each actuator having a key-connecting portion extending therefrom, a key connected to and movable with each reciprocable actuator, and alternate actuators having their key-connecting portions disposed in a pair of substantially parallel rows, so that the keys connnected to said key-connecting portions may be located in a pair of parallel rows.

References Cited in the file of this patent

UNITED STATES PATENTS

| | | |
|---|---|---|
| 2,089,768 | Stevenson | May 10, 1937 |
| 2,433,398 | Richard | Dec. 30, 1947 |